(12) United States Patent
Wei et al.

(10) Patent No.: US 12,433,251 B2
(45) Date of Patent: Oct. 7, 2025

(54) INTELLIGENT WATER DISPENSER FOR A PET

(71) Applicant: SHENZHEN LALAHOME SMARTECH CO., LTD., Shenzhen (CN)

(72) Inventors: Yanjiatai Wei, Shenzhen (CN); KaiShu Hui, Shenzhen (CN); Zhixing Wei, Shenzhen (CN); Guohong Tan, Shenzhen (CN)

( * ) Notice: Subject to any disclaimer, the term of this patent is extended or adjusted under 35 U.S.C. 154(b) by 143 days.

(21) Appl. No.: 18/332,276

(22) Filed: Jun. 9, 2023

(65) Prior Publication Data
US 2024/0407331 A1    Dec. 12, 2024

(51) Int. Cl.
*A01K 7/02* (2006.01)
*C02F 1/00* (2023.01)

(52) U.S. Cl.
CPC .............. *A01K 7/025* (2013.01); *C02F 1/003* (2013.01); *C02F 2307/10* (2013.01)

(58) Field of Classification Search
CPC .. A01K 7/025; A01K 7/02; A01K 7/00; C02F 2307/10; C02F 2307/12; C02F 2307/14; C02F 2307/20; B01D 27/00; B01D 35/00
USPC .......................................................... 119/77
See application file for complete search history.

(56) References Cited

U.S. PATENT DOCUMENTS

| | | | | |
|---|---|---|---|---|
| 634,828 | A * | 10/1899 | Miller | A01K 39/026 119/77 |
| 6,460,483 | B1 * | 10/2002 | Northrop | A01K 7/00 119/702 |
| 7,146,930 | B1 * | 12/2006 | Ness | A01K 7/02 141/366 |
| 7,958,844 | B1 * | 6/2011 | Northrop | A01K 7/02 119/74 |
| 8,117,991 | B1 * | 2/2012 | Civitillo | A01K 7/027 119/72 |
| 2006/0230676 | A1 * | 10/2006 | Rowe | A01G 9/02 119/74 |
| 2007/0277738 | A1 * | 12/2007 | Dentsbier | A01K 7/02 119/77 |
| 2011/0259273 | A1 * | 10/2011 | Lipscomb | A01K 45/002 119/74 |

(Continued)

FOREIGN PATENT DOCUMENTS

| | | | | |
|---|---|---|---|---|
| GB | | 2458173 A * | 9/2009 | ............... A01K 7/00 |
| WO | WO-2015013555 A1 * | | 1/2015 | ............... A01K 5/00 |

*Primary Examiner* — Zoe Tam Tran
(74) *Attorney, Agent, or Firm* — Sandy Lipkin

(57) ABSTRACT

The present invention applies to the technical field of pet caring equipment, and in particular relates to an intelligent water dispenser for a pet, including a control device, a water purifying tank, a wastewater tank, a drinking water basin, a water purifying conduit, a wastewater conduit, a water purifying flow driving device, and a wastewater flow driving device. The drinking water basin is provided with a drinking water outlet, a rinse water outlet, and a wastewater collecting port. The purified water in the water purifying tank flows to the drinking water outlet and the rinse water outlet via the water purifying conduit. The solution has the function of discharging accumulated water of the drinking water basin and rinsing the bottom of the drinking water basin at the same time, thus ensuring that the drinking water basin is clean, and improving the cleanliness of the drinking water of a pet.

5 Claims, 10 Drawing Sheets

(56) References Cited

U.S. PATENT DOCUMENTS

| | | | |
|---|---|---|---|
| 2012/0017839 A1* | 1/2012 | Veness | A01K 7/00 |
| | | | 119/74 |
| 2015/0096649 A1* | 4/2015 | Lathim | A01K 7/02 |
| | | | 141/324 |
| 2017/0362092 A1* | 12/2017 | Mainini | C02F 1/66 |
| 2018/0338470 A1* | 11/2018 | Sayers | A01K 7/022 |
| 2019/0059322 A1* | 2/2019 | Xu | A01K 7/02 |
| 2019/0239476 A1* | 8/2019 | Mai | A01K 7/02 |
| 2020/0100462 A1* | 4/2020 | Chen | A01K 7/025 |
| 2021/0156385 A1* | 5/2021 | Wang | A01K 7/02 |
| 2023/0157259 A1* | 5/2023 | Xue | A01K 7/025 |
| | | | 119/74 |

\* cited by examiner

INTELLIGENT WATER DISPENSER FOR A PET

TECHNICAL FIELD

The present invention belongs to the technical field of pet caring equipment, and in particular relates to an intelligent water dispenser for a pet.

TECHNICAL BACKGROUND

With the improvement of people's living standards, keeping a pet gradually becomes a hobby for many people. A pet enjoys increasingly higher status for an owner and a family. People gradually start to pay attention to the regular diet of a pet and diet hygiene.

To solve the problem that a pet cannot be fed with water in a timely manner, an intelligent water dispenser for a pet for automatically supplying water appears in a market. To avoid feeding water in a drinking water basin not to be discharged for a long time, resulting in the contamination of a pet drinking water, a self-cleaning pet drinking water dispenser that can drain the drinking water accumulated at the bottom of the pet drinking water basin for too long time also appears in the market.

However, in the technical solutions in the prior art, only the water in the drinking water basin can be discharged. If pet hairs, pet oral secretions, residual food and so on accumulate in the drinking water basin, the pet hairs, pet oral secretions, and residual food cannot be removed by simply drainage. Even if the drinking water basin is cleaned, there is still a risk of insufficient cleanliness of the pet drinking water.

SUMMARY

An objective of the present invention is to provide a pet intelligent water dispenser, which aims to solve the technical problem in the prior art that a dirty substance accumulated in the bottom of the drinking water basin cannot be self-cleaned and affects the cleanliness of a pet drinking water.

The technical solution of the present invention is realized as follows: an intelligent water dispenser for a pet includes a control device, a water purifying tank, a wastewater tank, a drinking water basin, a water purifying conduit, a wastewater conduit, a water purifying flow driving device, and a wastewater flow driving device. The control device controls the water purifying flow driving device and the wastewater flow driving device to drive the water flow in a corresponding water circuit to flow, respectively. The drinking water basin is provided with a drinking water outlet, a rinse water outlet, and a wastewater collecting port. The water purified in the water purifying tank flows to the drinking water outlet and the rinse water outlet via the water purifying conduit. The wastewater in the drinking water basin flows to the wastewater conduit via the wastewater collecting port and flows into the wastewater tank via the wastewater conduit. The water purified in the tank flows into the drinking basin via the rinse water outlet and/or the drinking water outlet and flows in the wastewater tank via the wastewater collecting port.

The present solution has the following beneficial effects: the rinse water outlet and the wastewater collecting port are cooperatively arranged, thereby realizing the separate function of rinsing the bottom of the drinking water basin. Compared with the prior art, the present invention can realize the regular drainage of the water accumulated in the drinking water basin, and further rinses the bottom of the drinking water basin when the accumulated water is drained away, thereby ensuring the cleanliness of the drinking water basin and enhancing the cleanliness of the drinking water of a pet.

Preferably, the drinking water basin is provided with a drinking water region and a wastewater region. The bottom of the wastewater region is lower than that of the drinking water region in a vertical direction. The wastewater collecting port is located at the bottom of the drinking water region, and communicates the wastewater region and the drinking water region. The wastewater region is provided as a buffer region for the wastewater in the drinking water basin before flowing into the wastewater conduit. The water accumulated in the drinking water region can be discharged to the wastewater region in a timely manner so that the pumping frequency of the wastewater provides a certain intermittent space and the pumping frequency is more reasonable.

Preferably, in order that the rinse water region of the rinse water can effectively cover the bottom of the drinking water basin, the following setting is adopted:

The rinse water outlet is located on one side of the bottom of the drinking water basin. The wastewater collecting port is located on the other side of the bottom of the drinking water basin. When the drinking water basin is provided with a drinking water region and a wastewater region, respectively, the rinse water outlet is located on one side of a bottom of the drinking water region, and the wastewater collecting port is located on the other side of the bottom of the drinking water region.

Preferably, in order that the flow of rinse water, after passing through the bottom of the drinking water basin, can intensively flow to the wastewater collecting port, the following setting is adopted:

The wastewater collecting port is located at the bottom of the drinking water basin, and the inner wall of the bottom of the drinking water basin is inclined towards the side of the wastewater collecting port. When the drinking water basin is provided with the drinking water region and the wastewater region, respectively, the wastewater collecting port is located at the bottom of the drinking water region, and the inner wall at the bottom of the drinking water region is inclined toward the wastewater collecting port.

Preferably, in order to reduce the flow of solid residues in the wastewater into the wastewater conduit and cause the blockage of the water conduit, the intelligent water dispenser for a pet further includes a wastewater filtering structure. The wastewater filtering structure is provided between the wastewater collecting port and the wastewater conduit.

Preferably, the wastewater filtering structure includes a filtering passage. The filtering passage includes a filtering inlet, a filtering outlet, and a filtering assembly provided between the filtering inlet and the filtering outlet. The filtering inlet is communicated with the wastewater collecting port. The inner wall of the bottom of the filtering passage is wholly or partially lower than the wastewater collecting port in a vertical direction. The lower region of the filtering passage is the solid residue sedimentation region, which improves the filtering effect and reduces the filtering pressure of the filter assembly.

Preferably, the filtering assembly is a filtering partition inserted in the filtering passage. The filtering partition is provided with water crossing holes from bottom to top. The water crossing holes have two or more types. A larger diameter of the water crossing holes are located at a lower part of the filtering partition. A smaller diameter of the water crossing holes are located at an upper part of the filtering partition. During the wastewater flow process, the coarser particles are located at the bottom and the finer particles are located at the top. Therefore, the distribution of the large and small diameters of the water crossing holes reduces the impact on the flow rate of water while ensuring the filtering needs.

Preferably, in order to enhance the integrity of a water conduit structure, the intelligent water dispenser for a pet further includes a water conduit transfer assembly. The water conduit transfer assembly includes a water purifying tank communicating port, a wastewater tank communicating port, a drinking water basin water purifying communicating port, and a drinking water basin wastewater communicating port. The drinking water basin is provided therein with a drinking water basin water purifying conduit and a drinking water basin wastewater conduit. One end of the drinking water basin water purifying conduit is communicated with the drinking water basin water purifying communicating port, and the other end of the drinking water basin water purifying conduit is communicated with the rinse water outlet and the drinking water outlet. One end of the drinking water basin water purifying conduit is communicated with the drinking water basin water purifying communicating port, and the other end of the drinking water basin water purifying conduit is communicated with the rinse water outlet and the drinking water outlet. One end of the drinking water basin wastewater conduit is communicated with the drinking water basin wastewater communicating port, and the other end of the drinking water basin wastewater conduit is communicated with the wastewater collecting port. An outlet of the water purifying tank communicates the water purifying tank communicating port of the water conduit transfer assembly and the drinking water basin water purifying conduit in turn, thereby forming the water purifying conduit. An inlet of the wastewater tank communicates the wastewater tank communicating port of the water conduit transfer assembly and the drinking water basin wastewater conduit in turn, thereby forming the wastewater conduit.

Preferably, the intelligent water dispenser for a pet also includes a main machine housing. The water conduit transfer assembly is arranged on the main machine housing via a sliding structure and can slide along a vertical direction. The drinking water basin is detachably connected to the main machine housing. The drinking water basin water purifying communicating port of and the drinking water basin wastewater communicating port of the water conduit transfer assembly are arranged vertically downward. The end of the drinking water basin water purifying conduit and the end of the drinking water basin wastewater conduit are arranged vertically and adaptively upwards. The water conduit transfer assembly slides upward in a vertical direction when the drinking water basin water purifying conduit and the drinking water basin wastewater conduit are communicated with the water conduit transfer assembly in alignment. An elastically pressing device is also provided to provide a downward pressing tendency for the water conduit transfer assembly. The water conduit transfer assembly is arranged on the main machine housing via the sliding structure and an elastic pressing structure to enhance the connection convenience of the drinking water basin and the main machine housing. When the drinking water basin is mounted, the drinking water basin abuts against the water conduit transfer assembly so that the water conduit transfer assembly slides upwards to avoid. When the drinking water basin reaches a water level, the elastically pressing device presses downward the water conduit transfer assembly, so that the water conduit transfer assembly is docked with the water conduit corresponding to the drinking water basin.

Preferably, the intelligent water dispenser for a pet also includes the main machine housing. The water purifying tank is located in the upper part of the main machine housing. The drinking water basin is removably connected to the lower outer side of the main machine housing. The water purifying flow driving device includes a solenoid valve provided in the lower part of the main machine housing for controlling on and off of the water purifying conduit, as well as a drinking water supply pump and a rinse water supply pump provided in the drinking water basin for controlling a water flow rate of the drinking water outlet and the rinse water outlet. The water purifying tank is located above the drinking water basin to control on and off of the water purifying conduit only through the solenoid valve. The purified water in the drinking water basin can flow downward under the action of gravity, thus reducing the power demand of the water purifying flow driving device, effectively reducing the noise produced by the water purifying flow driving device.

Preferably, to realize the water and electricity separation between the water purifying flow driving device and the water purifying conduit, the drinking water basin is provided with the drinking water basin water purifying conduit that is peripherally closed. A body of the drinking water supply pump and a body of the rinse water supply pump are located in the periphery of the drinking water basin water purifying conduit. Water pumping blades of the drinking water supply pump and the rinse water supply pump extend into the drinking water basin water purifying conduit, to drive a corresponding water flow to flow.

Preferably, the drinking water basin is provided with different heights of more than two drinking water regions, and the rinse water outlet and the wastewater collecting port are arranged in the drinking water region with the lowest height to match the drinking demand and hobbies of different pets.

Preferably, the more than two water purifying tanks are arranged, thus reducing the volume requirement of a single water tank, reducing the full mass of a single bucket, avoiding the problem of laborious water change in the water purifying tank, and also avoiding water cut-off of the water dispenser when the water purifying tank is replenished.

Preferably, the intelligent water dispenser for a pet also includes a planting box. The wastewater conduit flows through the planting box from the wastewater collecting port and is then communicated to the wastewater tank. The planting box is arranged to enhance the interactive function of the water dispenser. Wastewater has a certain amount of organic material, thus enhancing the utilization value of the wastewater.

Figure 1:
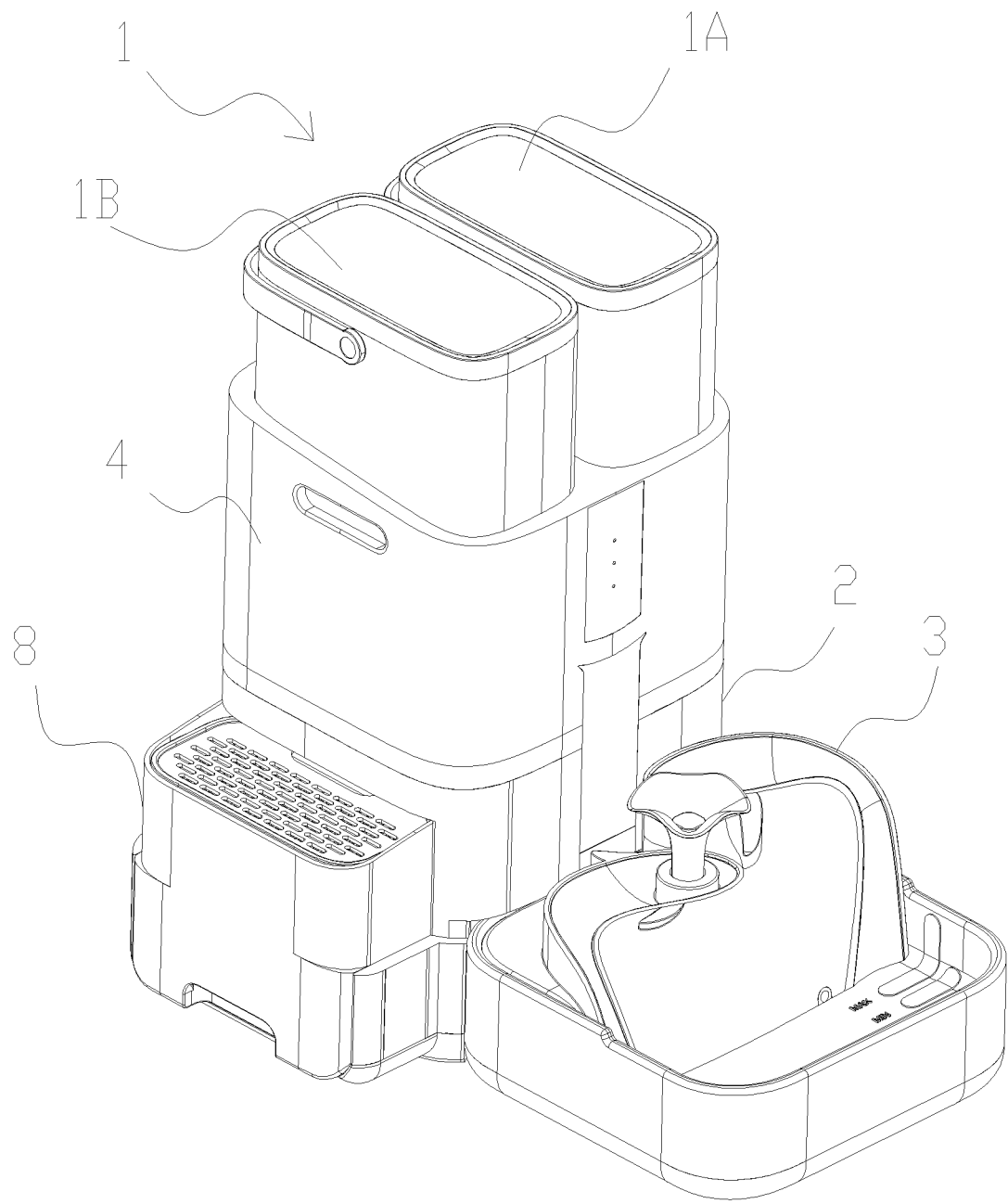
FIG. 1 is a perspective view of an intelligent water dispenser for a pet provided in an embodiment of the present invention.
Figure 2:
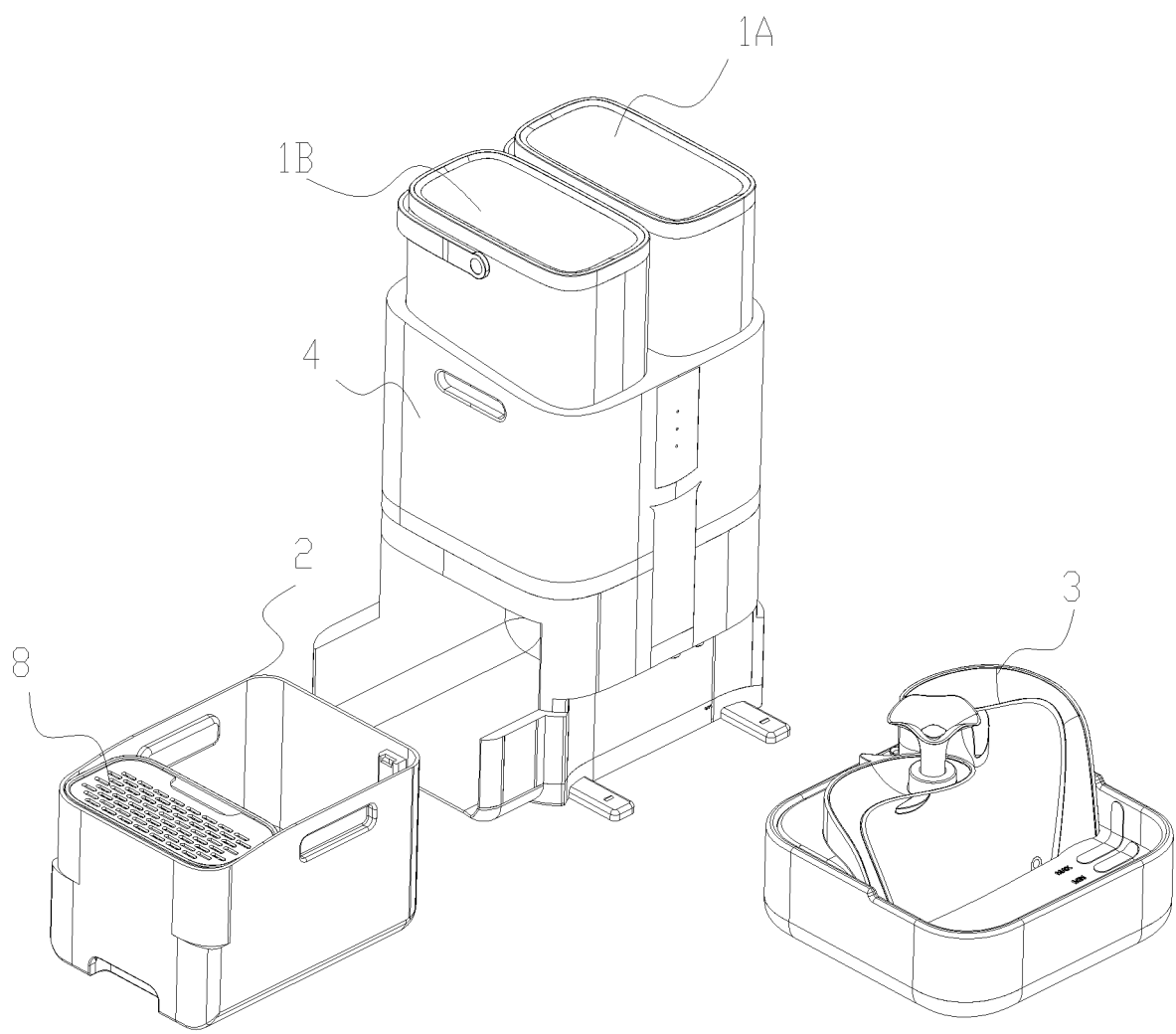
FIG. 2 is an exploded view of an intelligent water dispenser for a pet provided in an embodiment of the present invention.

The names of the components in the figures and their reference signs are:

1, water purifying tank; 1A, first water purifying tank; 1B, second water purifying tank; 2, wastewater tank; 201, wastewater tank inlet; 3, drinking water basin; 301, water spraying nozzle; 301A, drinking water outlet; 302, rinse water outlet; 303, drinking water basin water purifying conduit; 304, drinking water basin water purifying conduit; 305, wastewater collecting port; 3A, drinking water region; wastewater region, 3B; 4, main machine housing; 5, water purifying flow driving device; 501, solenoid valve; 502, drinking water supply pump; 503, rinse water supply pump; 6, diaphragm pump; 7, filtering passage; 701, filtering inlet; 702, filtering outlet; 703, filtering partition; 703A, water crossing hole; 8, planting box; 801, planting box outlet; 9, water transfer assembly, 901, water purifying tank communicating port; 902, wastewater tank communicating port; 903, drinking water basin water purifying communicating port; 904, drinking water basin wastewater communicating port; 9A, guide seat; 905, position limiting member; 906, spring.

SPECIFIC EMBODIMENTS

In order to make the objectives, technical solutions and advantages of the present invention clearer, the following further describes the present invention in detail with reference to the accompanying drawings and embodiments. It should be understood that the specific embodiments described herein are only used to explain the present invention, but not to limit the present invention.

Referring to FIGS. 1-8, an intelligent water dispenser for a pet provided in an embodiment of the present invention includes a control device, a water purifying tank 1, a wastewater tank 2, a drinking water basin 3, and a main machine housing 4. The water purifying tank 1, the wastewater tank 2, and the drinking water basin 3 are detachably provided on the main body housing 4, respectively. To ensure the overall volume of purified water while avoiding the weight of a single tank from being too large when unloading the water purifying tank 1 to add water, the water purifying tank is divided into a first water purifying tank 1A and a second water purifying tank 1B.

Referring to FIGS. 3 to 6, the drinking water basin 3 is provided with a water spraying nozzle 301, a rinse water outlet 302, and a wastewater collecting port 305. The water spraying nozzle 301 is provided with a drinking water outlet 301A. The water purifying tank 1A and the water purifying tank 1B are provided with a water outlet (not shown in the figures). The water outlet is communicated to the drinking water outlet 301A and the rinse water outlet 302 via a water purifying conduit. The water purifying conduit includes a water purifying conduit of the main machine arranged in the main machine housing 4 (not shown in the figures) and a drinking water basin water purifying conduit 303 arranged on the drinking water basin.

A water purifying flow driving device 5 for driving the flow of water in the water purifying conduit is further provided. The water purifying flow driving device includes a solenoid valve 501, a drinking water supply pump 502, and a rinse water supply pump 503. The working principle of the water purifying flow driving device 5 is as follows: after flowing out of an outlet thereof, the purified water in the water purifying tank 1A and the water purifying tank 1B flows to the respectively corresponding solenoid valve 501. The solenoid valve 501 is conducted. The purified water flow continues to flow to the drinking water basin water purifying conduit 303, and then is driven by the drinking water supply pump 502 and the rinse water supply pump 503 to flow to the drinking water outlet 301A and the rinse water outlet 302, respectively. Because of the larger height difference between the water purifying tank 1 and the drinking water basin 3, when the solenoid valve 501 is conducted, the purified water in the tank 1 forms a direct flow by gravity to the drinking water outlet 301A and the rinse water outlet 302. The main actions of the drinking water supply pump 502 and the rinse water supply pump 503 power are to control the corresponding flow rate. The technical solution of the water purifying flow driving device 5 provided in this embodiment can reduce the mechanical power needs of the water purifying conduit to a greater extent, reduce energy consumption, and reduce the noise of the operation of a power device.

Referring to FIG. 3, FIG. 4, FIG. 5, and FIG. 8, the drinking water basin 3 is provided with a drinking water region 3A and a wastewater region 3 that are mutually spaced. The wastewater collecting port 305 is communicated between the drinking water region 3A and the wastewater region 3. The bottom of the wastewater region 3B is lower than that of the drinking water region 3A, so that the drinking water accumulated in the drinking water region 3A can directly flow to the wastewater region due to a height difference; the wastewater conduit includes a main machine wastewater conduit (not shown in the figures) arranged in the main machine housing 4 and a drinking water basin wastewater conduit 304 arranged in the drinking water basin 3. One end of the drinking water basin wastewater conduit 304 is communicated to the main machine wastewater conduit, and the other end of the drinking water basin wastewater conduit is communicated to the wastewater region 3B.

A wastewater flow driving device is also provided to drive the flow of water in the wastewater conduit. The driving device is preferably a diaphragm pump 6. The wastewater flow driving device has the following working principle: when the amount of water accumulated in the drinking water basin in the wastewater region 3B reaches a preset value, the diaphragm pump 6 starts and drives the wastewater in the wastewater region 3B to flow into the drinking water basin wastewater conduit 304, then flows through the main machine wastewater conduit and flows into the wastewater tank 2 via the wastewater tank inlet 201.

The controller (not shown in the figures) is configured to control the wastewater flow driving device and the water purifying flow driving device 5 to open and close. To ensure a clear structure schematic introduction, the structures of the specific water purifying conduit and the wastewater conduit are not shown. The part of the structure is connected with a general pipeline.

The wastewater region 3B is provided as a buffer zone for the wastewater in the drinking water basin 3 before flowing into the wastewater conduit. The accumulated water in the drinking water region 3A, whether it is drinking water or rinse water, can be discharged to the wastewater region 3B in a timely manner to ensure that a pet can drink cleaner drinking water when the pet drinks. The wastewater region 3B provides a certain intermittent space for the pumping frequency of the wastewater, and the pumping frequency is more reasonable.

The embodiment has the following beneficial effects: the rinse water outlet 302 and the wastewater collecting port 305 are cooperatively arranged, thereby realizing the separate function of rinsing the bottom of the drinking water basin 3. Compared with the prior art, the present invention can realize the regular drainage of the water accumulated in the drinking water basin 3, and further rinses the bottom of the drinking water basin 3 when the accumulated water is drained away, thereby ensuring the cleanliness of the drinking water basin 3 and enhancing the cleanliness of the drinking water of the pet.

As a limited way, the water and electricity of the water purifying flow driving device 5 and the drinking water basin water purifying conduit 303 are separate. The drinking water basin water purifying conduit 303 is a closed water conduit structure. The body of the drinking water supply pump 502 and the body of the rinse water supply pump 503 are located at the periphery of the drinking water basin water purifying conduit 303. Water pumping blades (not shown in the figures) of the drinking water supply pump 502 and the rinse water supply pump 503 extend into the drinking water basin water purifying conduit 303 to drive the corresponding water flow to flow.

Figure 3:
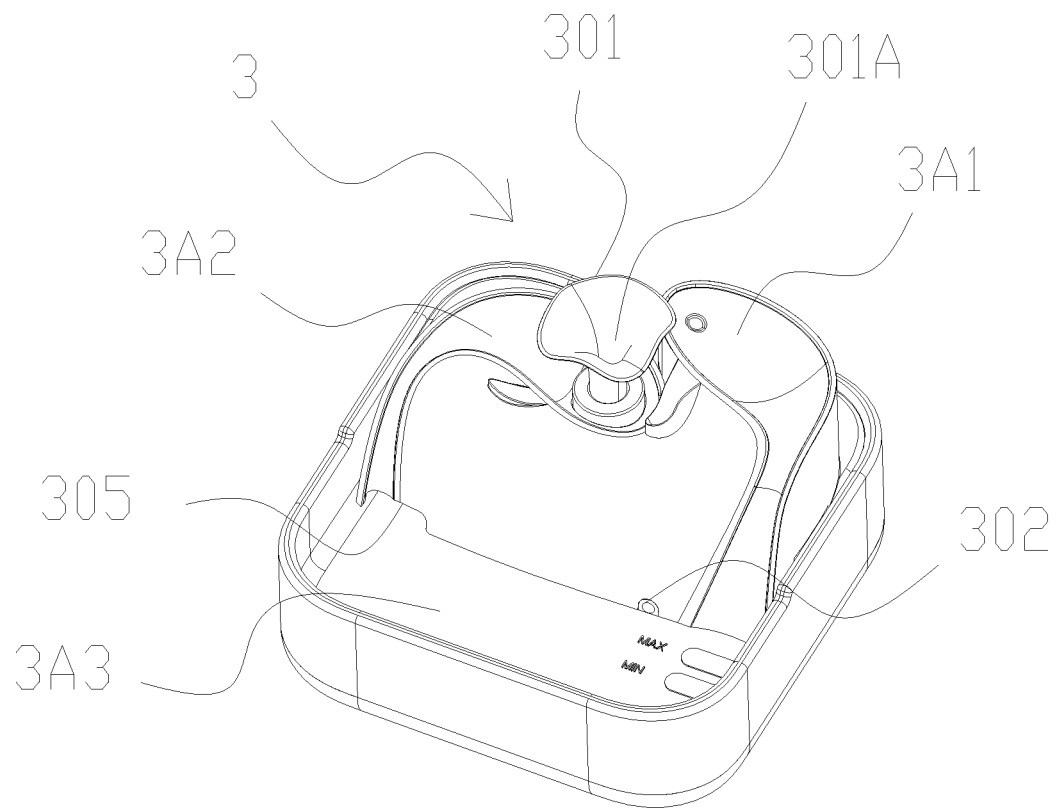
FIG. 3 is a perspective view 1 of a drinking water basin provided in an embodiment of the present invention.
Figure 4:
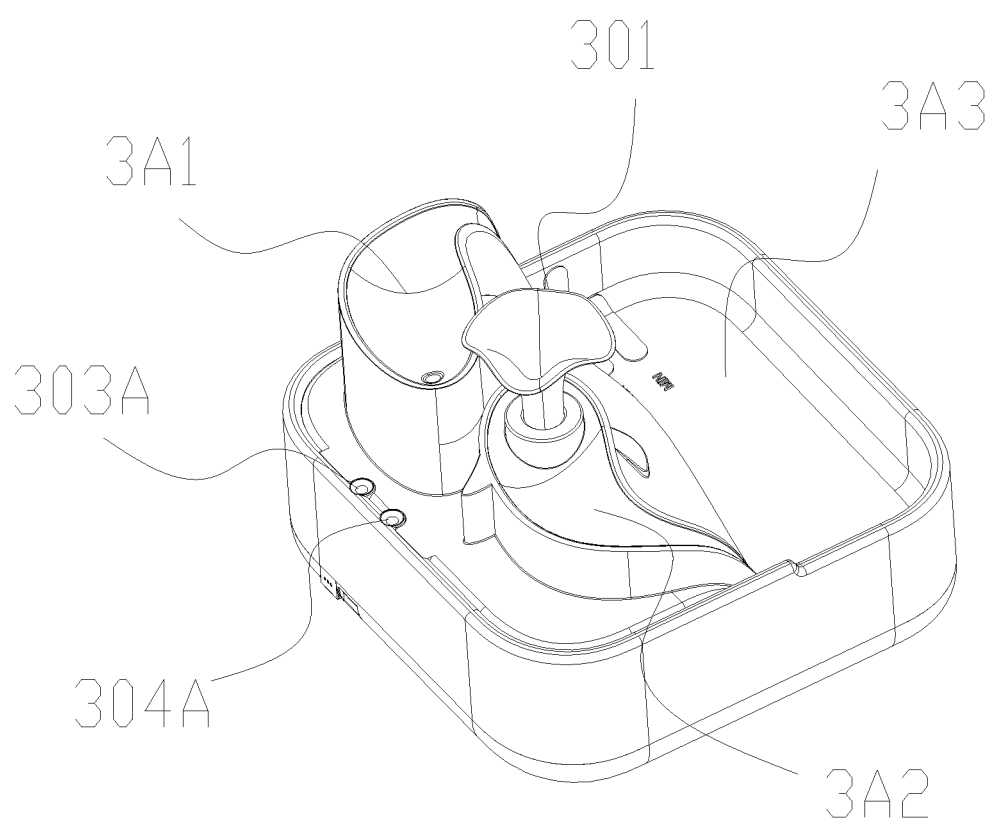
FIG. 4 is a perspective view 2 of a drinking water basin provided in an embodiment of the present invention.
Figure 5:
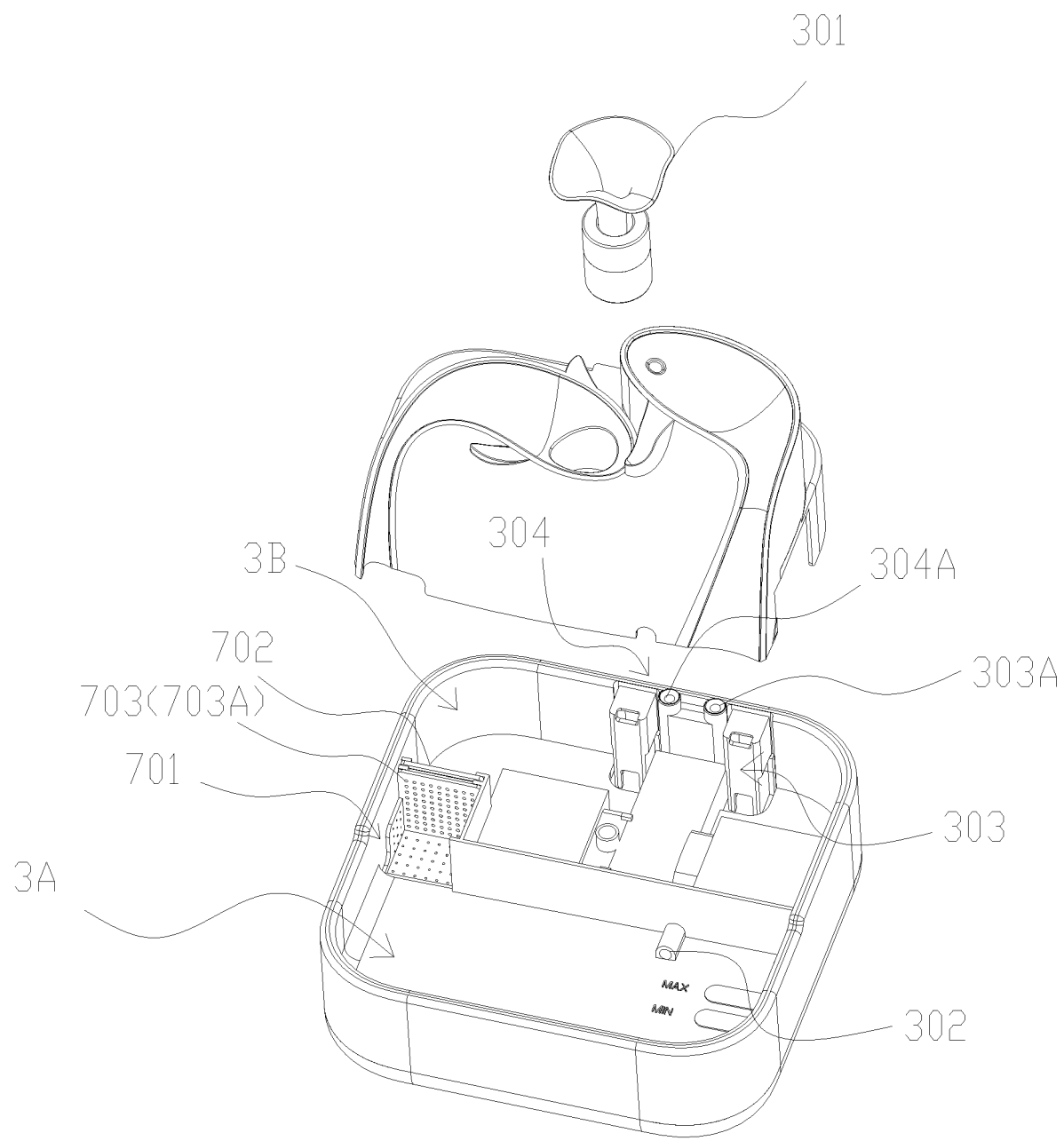
FIG. 5 is an exploded view of a drinking water basin provided in an embodiment of the present invention.
Figure 6:
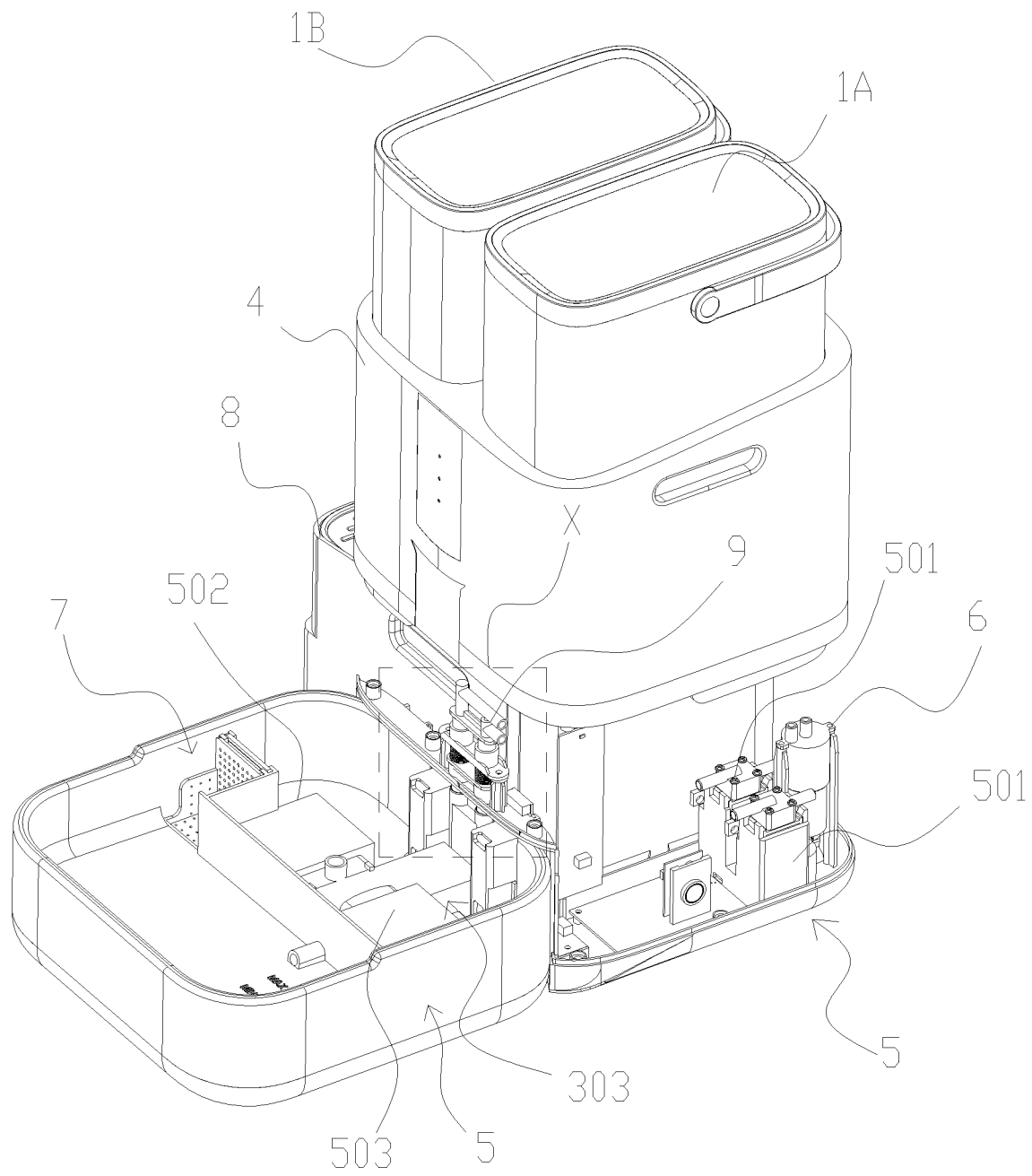
FIG. 6 is a schematic structural diagram of a pet water dispenser provided in an embodiment of the present invention.
Figure 7:
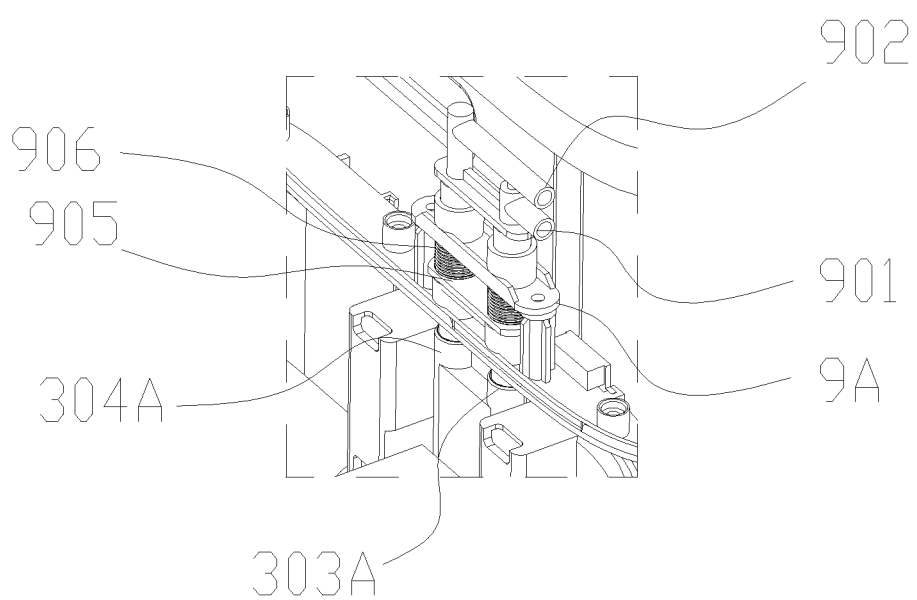
FIG. 7 is an enlarged view of a region X of FIG. 6.
Figure 8:
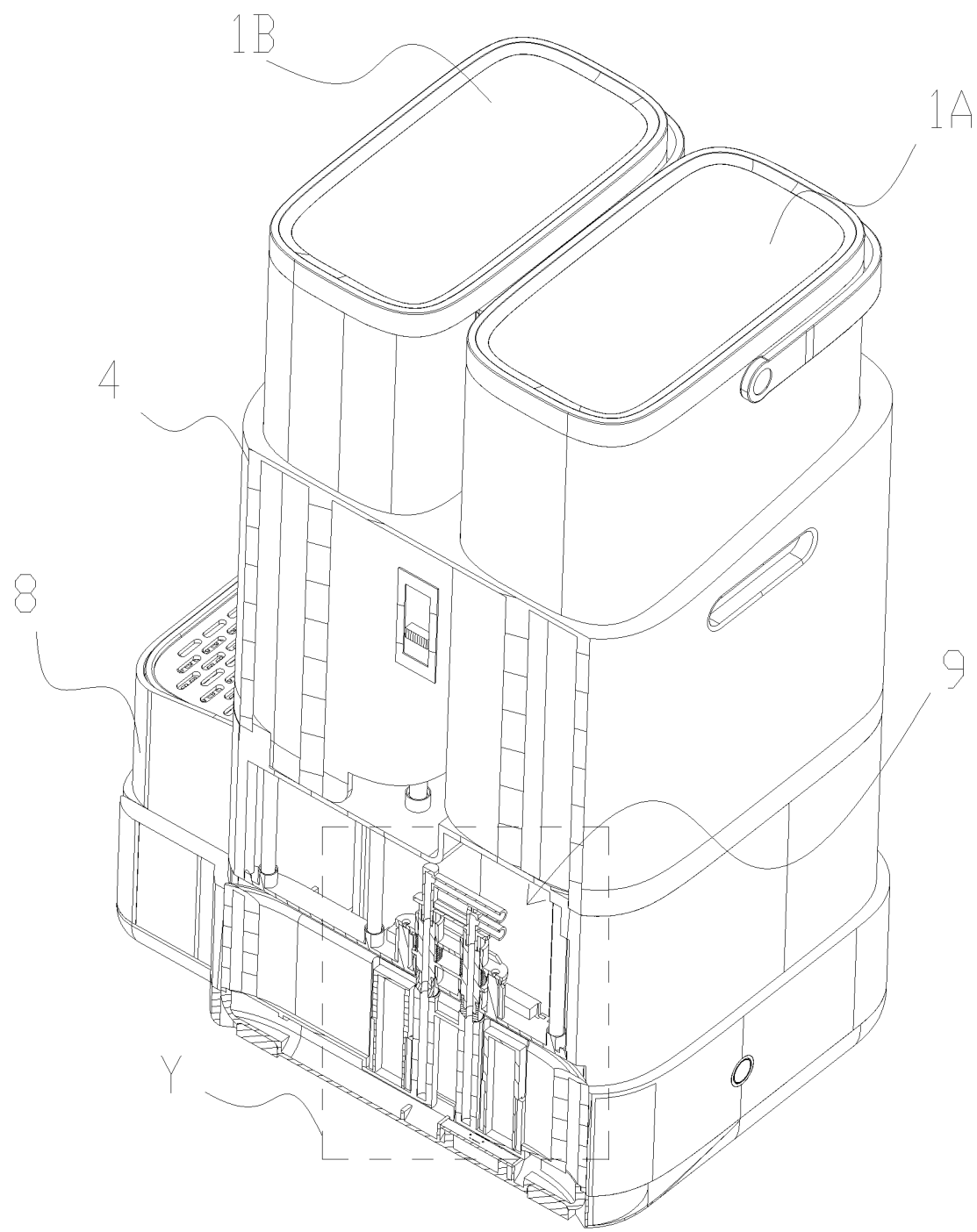
FIG. 8 is an exploded view 1 of a structure of a pet water dispenser provided in an embodiment of the present invention.
Figure 9:
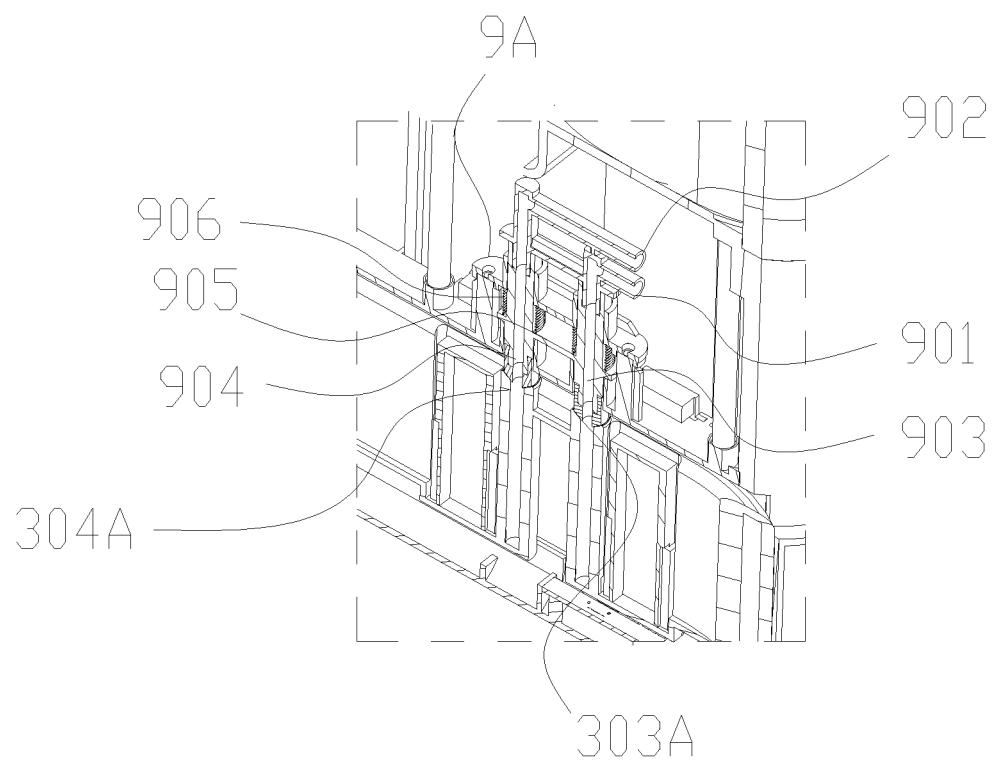
FIG. 9 is an enlarged view of a region Y of FIG. 8.
Figure 10:
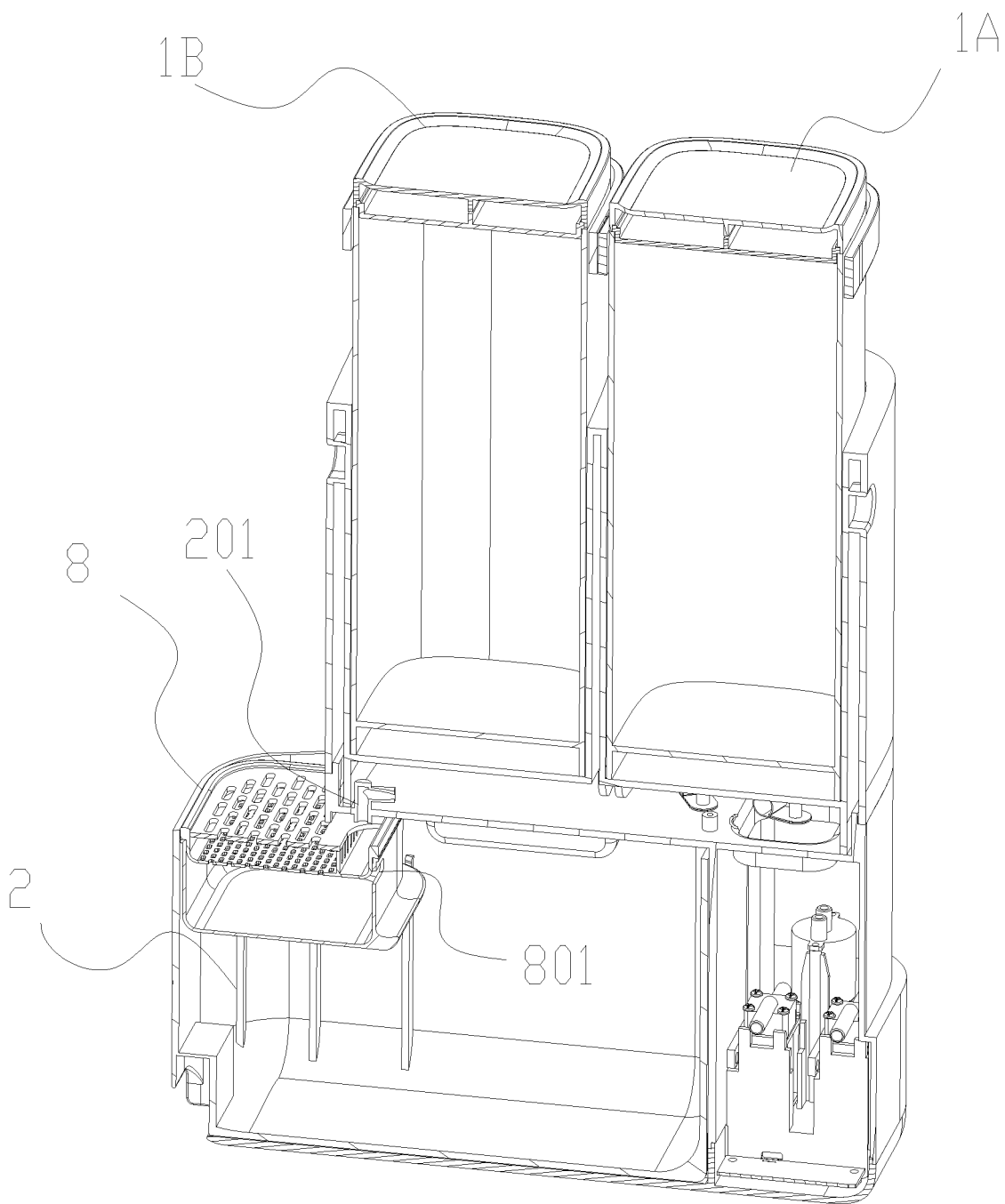
FIG. 10 is a structural cross-sectional view 2 of a pet water dispenser provided in an embodiment of the present invention.

Referring to FIGS. 3 to 5, to adapt to the needs and preferences of different pets for drinking height, three drinking water regions are arranged from high to low, respectively: a drinking water region 3A1, a drinking water region 3A2, and a drinking water region 3A3. The water spraying nozzle 301 is arranged on the highest drinking water region 3A1. The drinking water outlet 301A faces upwards vertically. The periphery of the drinking water outlet is provided with a petal-shaped flow guide, so that drinking water can flow like a fountain from the drinking water outlet to each of the drinking water regions. To have the better self-cleaning effect of the drinking water region 3A, the drinking water flows through the drinking water region 3A1 and the drinking water region 3A2 in turn, or flows to the lowest height of the drinking water region 3A3. The water flow direction of the rinse water outlet 302 is towards the bottom of the drinking water region 3A3.

In this embodiment, the rinse water outlet 302 is located at the bottom of the lowest height of the drinking water region 3A3. In order that the rinse region of the rinse water can effectively cover the bottom surface of the drinking water region 3A3, the following setting is adopted: the rinse water outlet 302 is located at one side of the bottom of the drinking water region 3A3, and the wastewater collecting port 305 is located on the other side of the bottom of the drinking water region 3A3, so that the outflowed rinse water can flow through most of the bottom region of the drinking water region 3A3 and then flows into the wastewater collecting port 305. In order that the flow of rinse water may be concentrated to the wastewater collecting port 305 after flowing through the bottom of the drinking water region 3A3, the bottom of the drinking water region 3A3 is inclined toward the wastewater collecting port 3A3.

Referring to FIG. 5, to reduce the flow of solid residues in the wastewater into the wastewater conduit and cause the water conduit to be blocked, the intelligent water dispenser for a pet further includes a wastewater filtering structure. The wastewater filtering structure includes a filtering passage 7. The filtering passage 7 includes a filtering inlet 701, a filtering outlet 702, and a filtering partition 703 provided between the filtering inlet 701 and the filtering outlet 702. The filtering inlet 701 is communicated with the wastewater collecting port 305. The inner wall of the bottom of the filtering passage 7 is lower than the wastewater collecting port 305 in a vertical direction. The lower region of the filtering passage 7 is the solid residue sedimentation region, which improves the filtering effect and reduces the filtering pressure of the filter partition 703. The filtering partition 703 is provided with water crossing holes from bottom to top. The water crossing holes 703A have two or more types. A larger diameter of the water crossing holes 703A are located at the lower part of the filtering partition. A smaller diameter of the water crossing holes 703A are located at the upper part of the filtering partition 703A. During the wastewater flow process, the coarser particles are located at the bottom and the finer particles are located at the top. Therefore, the distribution of the large and small diameters of the water crossing holes 703A reduces the impact on the flow rate of water while ensuring the filtering needs.

Referring to FIGS. 6 to 9, to enhance the integrity of a water conduit structure, the intelligent water dispenser for a pet also includes a water conduit transfer assembly 9. The water conduit transfer assembly 9 includes a water purifying tank communicating port 901, a wastewater tank communicating port 902, a drinking water basin water purifying communicating port 903, and a drinking water basin wastewater communicating port 904. In the water conduit transfer assembly 9, the water purifying tank communicating port 901 is communicated with the drinking water basin water purifying communicating port 903. The wastewater tank communicating port 902 is communicated with the drinking water basin wastewater communicating port 904. The drinking water basin water purifying communicating port 903 is connected to a water inlet 304A of the drinking water basin water purifying conduit. The drinking water basin water purifying communicating port 903 is connected to a water inlet 303A of the drinking water basin water purifying conduit. The drinking water basin wastewater communicating port 904 is connected to the drinking water basin wastewater conduit inlet 304A.

The drinking water basin water purifying communicating port 903 of and the drinking water basin wastewater communicating port 904 of the water line transfer assembly 9 are arranged vertically downward. A water inlet 303A of the drinking water basin water conduit 303 and a water inlet 304A of the drinking water basin wastewater conduit 304 are arranged vertically and adaptively upwards. The water conduit transfer assembly 9 is slidingly arranged on the main machine housing 4 via a guide seat 9A. The intelligent water dispenser for a pet also includes an elastic pressing device for providing downward pressing trend for the water conduit transfer assembly 9. The elastic pressing device includes a position limiting member 905 externally extending from the lower part of the water conduit transfer assembly 9, and a spring 906 between the guide seat 9A and the position limiting member 905.

When the drinking water basin 3 is mounted with the housing, the water inlet 303A of the drinking water basin water purifying conduit 303 on the drinking water basin and the water inlet 304A of the drinking water basin wastewater conduit 304 on the drinking water basin correspondingly abut against the drinking water basin water communicating port 903 of and the drinking water basin wastewater communicating port 904 of the water conduit transfer assembly 9. The water conduit transfer assembly 9 slides up to avoid.

When the drinking water basin 3 reaches a water level, the elastic pressing device presses downwards the water conduit assembly 9, so that the water conduit assembly is closely aligned with the water conduit corresponding to the drinking water basin 3.

As a preferred way, the intelligent water dispenser for a pet also includes a planting box 8. The wastewater flowing out of a water inlet 201 of the wastewater tank flows through the planting box 8 and then flows into a wastewater tank 2 via a water outlet 801 of the planting box. The planting box 8 is arranged to enhance the interactive function of the drinking water basin. Wastewater has a certain amount of organic material, thus enhancing the utilization value of the wastewater.

Each technical feature of the above described embodiment can be combined in any way. For the sake of concise description, not all possible combinations of each technical feature of the above described embodiment are described. However, as long as there is no contradiction in the combination of these technical features, the technical features should be considered as the scope of this specification.

The forgoing embodiments only express a plurality of embodiments of the present invention, and the description was relatively specific and detailed, but it should not be understood as a limitation to the patent scope of the present invention. It should be noted that for the person of ordinary skill in the art, a number of variants and improvements can be made without departing from the conception of the present invention, which all belong to the scope of protection of the present invention. Therefore, the scope of protection of the patent of the present invention shall be subject to the appended claims.

The forgoing are only the preferred embodiments of the present invention and are not intended to limit the present invention. Any modification, equivalent replacement and improvement made within the spirit and principle of the present invention shall be included within the protection scope of the present invention.

What is claimed is:

1. An intelligent water dispenser for a pet, comprising a control device, a water purifying tank, a wastewater tank, a drinking water basin, a water purifying conduit, a wastewater conduit, a water purifying flow driving device, and a wastewater flow driving device, wherein the control device controls the water purifying flow driving device and the wastewater flow driving device to drive flow of water in a corresponding water conduit to flow, respectively;
   the drinking water basin is provided with a drinking water outlet, a rinse water outlet, and a wastewater collecting port;
   water in the water purifying tank flows to the drinking water outlet and the rinse water outlet via the water purifying conduit; wastewater in the drinking water basin flows to the wastewater conduit via the wastewater collecting port and then flows to the wastewater tank via the wastewater conduit;
   water in the purifying tank flows into the drinking water basin via the rinse water outlet and/or the drinking water outlet, and flows to the wastewater tank via the wastewater collecting port;
   a wastewater filtering structure, wherein the wastewater filtering structure is provided between the wastewater collecting port and the wastewater conduit
   wherein the wastewater filtering structure comprises a filtering passage, the filtering passage comprises a filtering inlet, a filtering outlet, and a filtering assembly provided between the filtering inlet and the filtering outlet, the filtering inlet is communicated with the wastewater collecting port, and an inner wall of a bottom of the filtering passage is wholly or partially lower than the wastewater collecting port in a vertical direction and
   wherein the filtering assembly is a filtering partition inserted in the filtering passage, the filtering partition is provided with water crossing holes from bottom to top, the water crossing holes have two or more types, a larger diameter of the water crossing holes are located at a lower part of the filtering partition, and a smaller diameter of the water crossing holes are located at an upper part of the filtering partition.

2. The intelligent water dispenser for a pet according to claim 1, further comprising a water conduit transfer assembly, wherein the water conduit transfer assembly comprises a water purifying tank communicating port, a wastewater tank communicating port, a drinking water basin water purifying communicating port, and a drinking water basin wastewater communicating port; and the drinking water basin is provided with a drinking water basin water purifying conduit and a drinking water basin wastewater conduit;
   one end of the drinking water basin water purifying conduit is communicated with the drinking water basin water purifying communicating port, and the other end of the drinking water basin water purifying conduit is communicated with the rinse water outlet and the drinking water outlet; one end of the drinking water basin wastewater conduit is communicated with the drinking water basin wastewater communicating port, and the other end of the drinking water basin wastewater conduit is communicated with the wastewater collecting port;
   a water outlet of the water purifying tank communicates the water purifying tank communicating port of the water conduit transfer assembly and the drinking water basin water purifying conduit in turn to form the water purifying conduit;
   a water inlet of the wastewater tank communicates the wastewater tank communicating port of the water conduit transfer assembly and the drinking water basin wastewater conduit in turn to form the wastewater conduit.

3. The intelligent water dispenser for a pet according to claim 2, further comprising a main machine housing, wherein the water conduit transfer assembly is provided on the main machine housing via a sliding structure, and is capable of sliding in a vertical direction;
   the drinking water basin is detachably connected to the main machine housing; the drinking water basin water purifying communicating port of and the drinking water basin wastewater communicating port of the water conduit transfer assembly are arranged vertically downward, an end of the drinking water basin water purifying conduit and an end of the drinking water basin wastewater conduit are arranged vertically and adaptively upwards; and the water conduit transfer assembly slides upward in a vertical direction when the drinking water basin water purifying conduit and the drinking water basin wastewater conduit are communicated with the water conduit transfer assembly in alignment;
   an elastically pressing device is also provided to provide a downward pressing tendency for the water conduit transfer assembly.

4. The intelligent water dispenser for a pet according to claim 1, further comprising the main machine housing, wherein the water purifying tank is located in an upper part of the main machine housing, and the drinking water basin is removably connected to an outer side of a lower part of the main machine housing;

the water purifying flow driving device comprises a solenoid valve provided in the lower part of the main machine housing for controlling on and off of the water purifying conduit, as well as a drinking water supply pump and a rinse water supply pump provided in the drinking water basin for controlling a water flow rate of the drinking water outlet and the rinse water outlet.

5. The intelligent water dispenser for a pet according to claim 4, wherein the drinking water basin is provided with the drinking water basin water purifying conduit that is peripherally closed, a body of the drinking water supply pump and a body of the rinse water supply pump are located in a periphery of the drinking water basin water purifying conduit, and water pumping blades of the drinking water supply pump and the rinse water supply pump extend into the drinking water basin water purifying conduit, to drive a corresponding water flow to flow.

* * * * *